(No Model.) 2 Sheets—Sheet 1.

J. B. TURCHIN.
HORSE SPADING MACHINE.

No. 300,413. Patented June 17, 1884.

WITNESSES:
J. G. Moore
Walter S. Dodge.

INVENTOR:
John B. Turchin,
by Dodge & Son,
Attys.

(No Model.)  2 Sheets—Sheet 2.

J. B. TURCHIN.
HORSE SPADING MACHINE.

No. 300,413.  Patented June 17, 1884.

WITNESSES:
J. G. Moore
Walter S. Dodge

INVENTOR:
John B. Turchin,
by Dodge & Son,
Attys.

UNITED STATES PATENT OFFICE.

JOHN B. TURCHIN, OF RADOM, ILLINOIS.

HORSE SPADING-MACHINE.

SPECIFICATION forming part of Letters Patent No. 300,413, dated June 17, 1884.

Application filed August 8, 1881. (No model.)

*To all whom it may concern:*

Be it known that I, JOHN B. TURCHIN, a citizen of the United States, residing at Radom, in the county of Washington and State of Illinois, have invented new and useful Improvements in Horse Spading-Machines, of which the following is a specification.

My invention relates to that class of machines in which a rotary drum or cylinder armed with cutting-blades is caused to revolve in a backward direction relatively to the travel of the machine, and to cut the soil from below upward.

The improvements consist in various features and details of construction hereinafter pointed out, designed to simplify the construction of the machine, and particularly to insure the proper elevation of the soil and its delivery in an inverted position in rear of the spading drum or cylinder.

Figure 1:
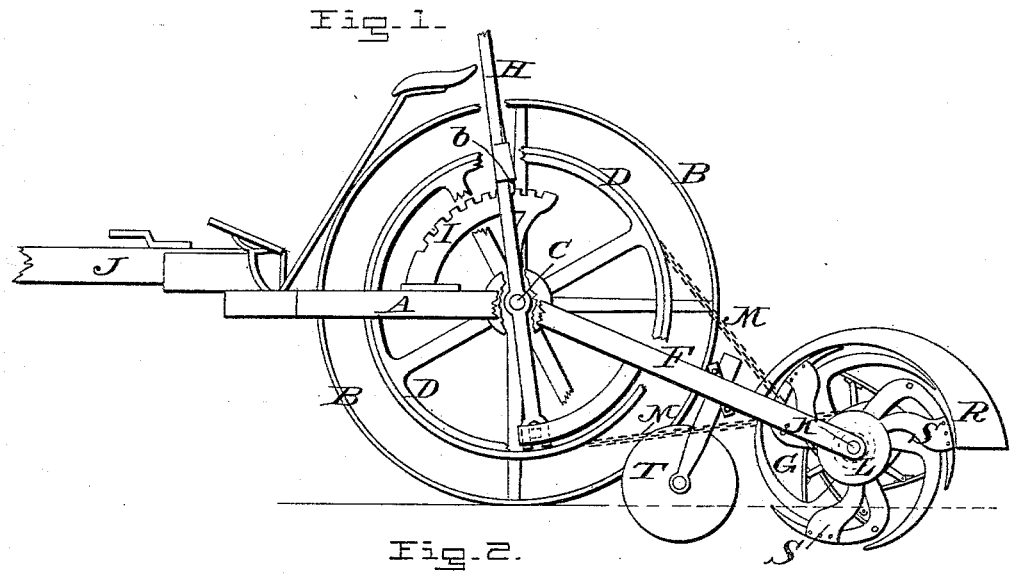
Figure 2:
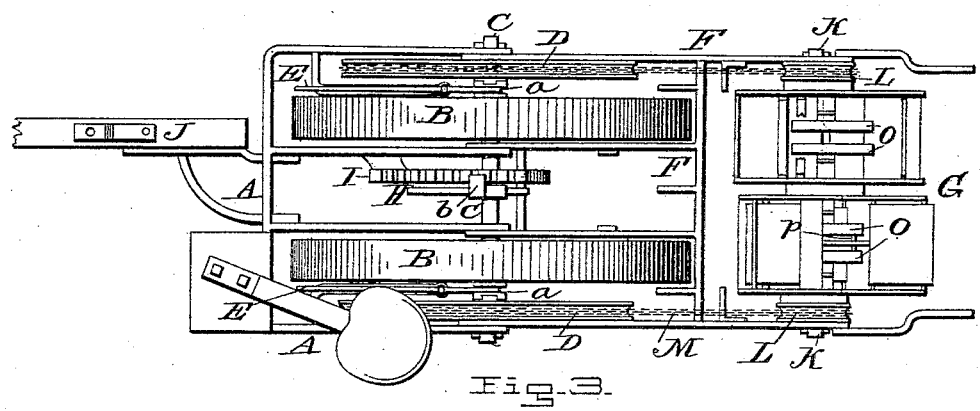
Figure 3:
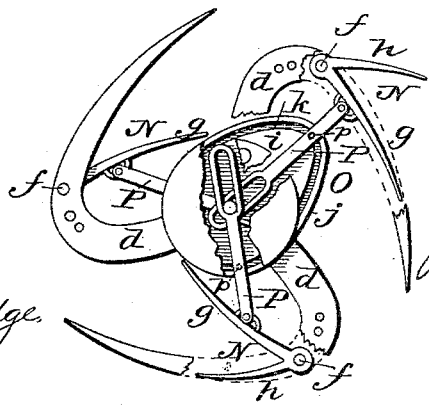
Figure 4:
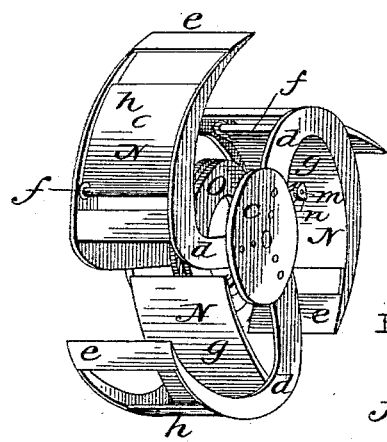
Figure 5:
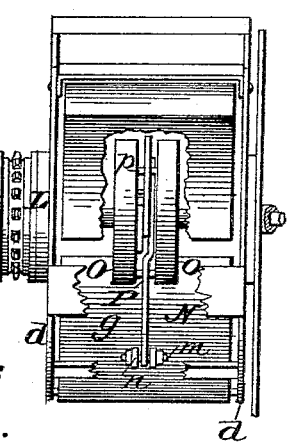
Figure 6:
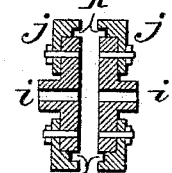
Figures 7, 8:
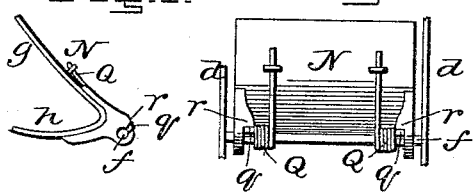
Figure 9:
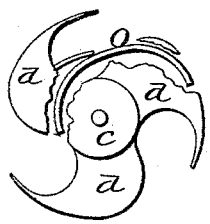
Figure 10:
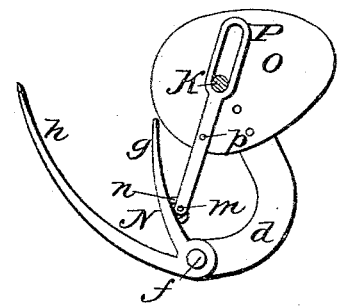

In the accompanying drawings, Figure 1 represents a side elevation of my improved machine, partially broken away to show the adjusting devices; Fig. 2, a top plan view; Fig. 3, a side elevation of the cutting drum or cylinder, partially broken away to show the discharging-cam and attendant parts; Fig. 4, a perspective view, and Fig. 5 a face view of the rotary cutting drum or cylinder; Fig. 6, a sectional view of the cam; Figs. 7, 8, and 9, views illustrating certain details of a slight modification; and Fig. 10, a view showing the cutting-blade and the discharging wing or plate united or made in one.

The object of my invention is to insure the proper cutting of the soil and its deposit in rear of the machine in an inverted position, as is done by a plow; and to this end I construct the machine in the following manner, reference being had to the accompanying drawings, in which A indicates a rectangular frame, advisably made of metal, but which may be of wood, in whole or in part, and B B ground or traction wheels by which said frame is supported and carried. The wheels B are rigidly secured upon an axle, C, which rotates in suitable boxes or bearings in the frame A, the axle being also furnished with sprocket or chain wheels D, which are loose upon the shaft or axle C, and rotate therewith only when locked thereto by sliding clutches $a$, which are caused to rotate with the axle by a spline or feather thereon, as is common in clutches. The clutch-collars $a$ are provided with shifting-levers E, by which they may be independently adjusted, so that either wheel D may be caused to rotate without the other.

F indicates a supplemental rear frame, journaled at its forward end upon the axle C, and adapted to rise and fall, to vary the elevation of its rear end, in which is mounted the rotary cutting cylinder or body G. A hand-lever, H, also journaled upon the axle C, has its lower end connected with the rear frame, F, and serves to raise and lower the frame as required, said lever being furnished with a locking-dog, $b$, which engages in notches in a curved rack, I, secured upon the main frame A, and thereby holds the lever, and consequently the cutter-frame F, at any required adjustment. In this way the depth of penetration of the spades or cutters may be perfectly regulated and controlled. The frame A is furnished with a suitable tongue, J, as shown.

The cutting-drum or rotary cutter G revolves upon a fixed or stationary axle, K, secured in frame F at or near the rear end thereof, and consists of central hubs or heads, $c$, to which are bolted or otherwise secured curved arms $d$, between and to which are secured the cutting-blades $e$, as more plainly shown in Fig. 4. The arms $d$ extend outward from the hubs or plates $c$ in a substantially-radial direction, and then curve forward, so that their outer faces or edges form arcs of a circle concentric with axle K, as shown in Figs. 1, 2, 3, and 4. The hubs or plates $c$ are separated, leaving a space between the arms equal to the desired width of the cutting-blades—two such heads with their sets of arms being used for a single rotary drum, and one, two, or more drums being used, as desired, two being represented in the drawings.

Secured to each hub or head $c$ is a sprocket-wheel, L, in line with one of the sprocket-wheels D of the main axle C, and receiving motion therefrom in a reverse direction through a driving-chain, M, crossed, as shown. Owing to the greater diameter of the wheels D, the wheels L, and consequently the rotary cutters or drums to which they are applied, will make a number of revolutions for each one made by the wheels D, thereby causing the soil to be cut in comparatively thin slices, which will facilitate the operation of the machine.

The cutting-blades e are made of steel or of iron having its cutting-edge chilled or faced with steel, and they are preferably bolted or otherwise secured directly and firmly to the curved arms d, as shown in Fig. 4, though they may be differently supported, as presently explained.

N indicates an L-shaped bucket, of which there is one for each cutting-blade and pair of carrying-arms. These buckets are journaled upon cross-rods f, connecting and serving to brace the arms d, and consist each of two wings, g and h, the latter curved to conform to the outer curvature of the arms d, and the former curving inward somewhat toward the axle K of the drum or cylinder. During the cutting operation the wing h remains in line with the blade or cutter e, and with the outer face of arms d following said cutter and passing beneath the slice of soil cut thereby, which is thus received into the bucket or into the open space between the two wings g and h thereof, to be carried upward over the axle and discharged in rear of the drum or cutting-cylinder.

O represents a cam rigidly secured to the fixed axle K between the arms d, one for each rotary drum or cylinder, preferably formed, as shown in Fig. 6, of two plates, i, having their peripheries or outer faces made of proper form, and provided with flanged plates or bands j, which being bolted to the plates i, as shown, form or leave between their overhanging flanges and the outer edges of plates i cam-grooves k, as shown. The purpose of the cam or cams is to hold the buckets in a fixed position relatively to the carrying-arms during the cutting and elevating operation, and then to rock or tip said buckets to effect the discharge of the soil therefrom, and the buckets are therefore each provided with an operating rod or bar, P, the upper end of which is slotted to straddle the axle K, by which it is consequently guided, and the lower end of which is connected to the wing g of the bucket N by a pin, m, passing through the bar and through the elongated eyes n, formed in lugs or ears on the back of wing g, as shown in Fig. 3. A pin, p, passing through the bar P, enters the cam-grooves k, and as the cutting drum or cylinder rotates causes said arms to be held stationary as to longitudinal movement, or to be moved radially inward or outward toward or away from the axle K, according to which part of the slot or cam-groove the pin is in at the time. The groove k is concentric with the axle K through about one-half of a circle, and then extends outward away from and returns to the semicircular line, as indicated in Fig. 3, so that from the time of beginning the cutting operation of any blade, and until said blade passes upward over and to the rear of the axle, the bucket N in rear of that blade remains stationary between the arms d, though of course traveling forward with them. When, however, the eccentric portion of the cam-groove k is reached by the pin p, said pin is moved outward away from axle H, carrying with it the bar P, and through the latter rocking or tipping the bucket N outward, as shown in Fig. 3, causing it to discharge its contents directly downward, and of course in an inverted position, because the bucket N is inverted after receiving and before discharging the soil.

It is apparent that the forward edge of the wing h of the bucket N may be sharpened and made to form the cutter, instead of employing a special cutting-blade, e, the action remaining essentially the same, and the construction being otherwise unchanged.

If desired, the rods or bars P may be dispensed with and the buckets restored to and held in their normal working position by springs, the wings g in such case bearing directly upon the outer face of the cam O, and being thus caused to tip or throw out the buckets. When this plan is adopted, the rods f, on which the buckets are journaled or pivoted, are formed with shoulders q, and the buckets N are provided with like shoulders, r, which meet with the shoulders q when the bucket is thrown outward sufficiently, thus limiting the movement of the bucket in the same manner as do the bars P when they are used.

Q Q indicate springs, which are coiled about the rod f, and have one end firmly secured thereto, while the other end of each bears against the outer face of wing g of the bucket N, and serves to throw the bucket inward and to hold its wing h at all times in contact with the outer face of cam O, which, overcoming the tension of the springs, will at the proper point throw the bucket outward, as explained.

In order to prevent the soil from escaping from the buckets too soon and before they are completely inverted, guards R are carried over the tops of the rotary drums or cylinders G and secured to the frame F in any convenient manner.

For very light or sandy soils it will also be found advisable to provide side guards, S, properly secured to the hubs or heads c and to the arms d, these guards serving both to prevent the escape of the soil, and to brace and stiffen the arms d.

In some cases it may be found necessary or desirable to make the arms d wide, as shown in Fig. 9, so that they shall themselves constitute guards to prevent the escape of the soil, and affording greater strength.

Rolling colters T may be employed to assist in cutting the soil, leaving for the blades e only the raising of or cutting beneath the soil.

I am aware that rotary cutting-cylinders arranged to rotate backward relatively to the carrying-wheels have before been used, and I do not broadly claim such construction; but I believe my construction and arrangement of parts to be new and well adapted to the end sought to be accomplished.

Having thus described my invention, what I claim is—

1. In a spading-machine, a cylinder consisting of a hub or hubs carrying a series of curved arms, $d$, having curved wings N pivoted thereto transversely, with a fixed cam, O, and connecting rods or springs arranged to hold said wings in position for receiving the earth as it is cut, and then causing them to swing outward and deliver the earth into the furrow in rear of the cylinder, substantially as shown and described.

2. The combination of the stationary axle K, having the grooved cam O secured thereon, with the rotating spading cylinder or drum, carrying the pivoted buckets or wings N, and the slotted rods P, provided with a pin, $p$, arranged to work in the groove of said cam, said rods having one end connected to the buckets or wings, and their slotted ends working loosely on the axle K, substantially as and for the purpose set forth.

3. A rotating spading drum or cylinder provided with the pivoted wings or buckets N, arranged to operate as described, and mounted in the pivoted frame or bars F, in combination with the main frame A, mounted on wheels B B, with clutches $a$, and driving-wheels D L, connected by chains M, all constructed and arranged for joint operation substantially as shown and described.

4. A cylinder or drum for spading-machines, consisting of a series of curved arms, $d$, having cutters $e$ secured to their outer ends, with buckets or wings N, pivoted to said arms in rear of the cutters, and arranged to operate substantially as shown and described.

JOHN B. TURCHIN.

Witnesses:
THOMAS MOBLAVICH,
ADALBERTUS MALINOWSKI.